(12) United States Patent
Matsubara

(10) Patent No.: US 7,861,602 B2
(45) Date of Patent: *Jan. 4, 2011

(54) EXPLOSION-PROOF HIGH TEMPERATURE COMPATIBLE, MULTI-VORTEX FLOW METER

(75) Inventor: Naoki Matsubara, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/087,367

(22) PCT Filed: Mar. 26, 2007

(86) PCT No.: PCT/JP2007/057321

§ 371 (c)(1),
(2), (4) Date: Jul. 2, 2008

(87) PCT Pub. No.: WO2007/122978

PCT Pub. Date: Nov. 1, 2007

(65) Prior Publication Data

US 2009/0120206 A1    May 14, 2009

(30) Foreign Application Priority Data

Apr. 20, 2006   (JP) .............................. 2006-117084

(51) Int. Cl.
G01F 1/32 (2006.01)
G01F 1/68 (2006.01)
(52) U.S. Cl. ............... 73/861.22; 73/204.21; 73/204.22
(58) Field of Classification Search ........................ None
See application file for complete search history.

(56) References Cited

U.S. PATENT DOCUMENTS 4,350,047 A * 9/1982 Dewey et al. ............ 73/861.22

(Continued)

FOREIGN PATENT DOCUMENTS

JP         6-34417         2/1994

(Continued)

OTHER PUBLICATIONS

International Search Report mailed May 22, 2007 for International Application No. PCT/JP2007/057321.

*Primary Examiner*—Harshad Patel
(74) *Attorney, Agent, or Firm*—Wenderoth, Lind & Ponack, L.L.P.

(57) ABSTRACT

A temperature-sensitive sensor (21) and a heating temperature-sensitive sensor (22) are fixed in position in a liquid-tight fashion by welding, with the metal tubular bodies (36 and 37) being inserted into the tubular body insertion holes (19 and 20) of a vortex detector (4). Sealing performance is secured without using any O-ring. The temperature-sensitive sensor (21) and the heating temperature-sensitive sensor (22) respectively have lead wires (42 and 43) held together with the lead wires (27) of a vortex detection sensor (11) within the internal space (35), and the lead wires (27, 42, and 43) thus held together are led out toward the flow rate converter (not shown) via a metal pipe (34). Since the lead wires (27, 42, and 43) are held together within the internal space (35) and led out toward the flow rate converter via the metal pipe (34), there is involved only one joint portion between the sensors and the flow rate converter. With this structure, explosion-proof performance can be attained easily.

8 Claims, 1 Drawing Sheet

U.S. PATENT DOCUMENTS

| | | | | |
|---|---|---|---|---|
| 4,887,469 A | * | 12/1989 | Shoptaw | 73/861.77 |
| 5,121,658 A | * | 6/1992 | Lew | 73/195 |
| 5,736,647 A | * | 4/1998 | Matsubara et al. | 73/861.22 |
| 6,047,602 A | * | 4/2000 | Lynnworth | 73/632 |
| 6,053,053 A | * | 4/2000 | Huotari | 73/861.22 |
| 6,128,072 A | * | 10/2000 | Kiel et al. | 356/28 |
| 6,275,284 B1 | * | 8/2001 | Kiel et al. | 356/28 |
| 6,366,436 B1 | * | 4/2002 | Maier et al. | 361/93.9 |
| 6,543,297 B1 | * | 4/2003 | Kleven | 73/861.52 |
| 6,739,177 B2 | * | 5/2004 | Sato et al. | 73/23.31 |
| 6,981,513 B2 | * | 1/2006 | Krywitsky | 137/68.14 |
| 7,614,297 B2 | * | 11/2009 | Matsubara | 73/204.19 |
| 2005/0092101 A1 | * | 5/2005 | Bengtson | 73/861.22 |
| 2005/0217389 A1 | * | 10/2005 | Foster | 73/861.22 |

FOREIGN PATENT DOCUMENTS

| | | |
|---|---|---|
| JP | 2869054 | 12/1998 |
| JP | 11-325989 | 11/1999 |
| JP | 2004-12220 | 1/2004 |
| JP | 2006-29966 | 2/2006 |

* cited by examiner

EXPLOSION-PROOF HIGH TEMPERATURE COMPATIBLE, MULTI-VORTEX FLOW METER

TECHNICAL FIELD

The present invention relates to a multi-vortex flow meter endowed with both the function of a vortex flow meter and the function of a thermal flow meter and, more specifically, to a multi-vortex flow meter which is explosion-proof and high temperature compatible.

BACKGROUND ART

To measure the flow rate of a fluid to be measured flowing through a flow tube, there are used a vortex flow meter and a thermal flow meter.

As is well known in the art, the vortex flow meter utilizes the fact that, when a vortex generator is arranged in a fluid flow, within a predetermined Reynolds number range, the number of Karman vortexes generated from the vortex generator per unit time (vortex frequency) is in proportion to the flow rate regardless of whether the fluid is gas or liquid; this constant of proportionality is called Strouhal number. As a vortex detector, there are exemplified a thermal sensor, a distortion sensor, a photo sensor, a pressure sensor, and an ultrasonic sensor; these are capable of detecting thermal change, lift change, etc. due to a vortex. The vortex flow meter is a simple flow meter capable of measuring flow rate without being affected by the physical properties of the fluid to be measured, and is widely used for flow rate measurement of gas and fluid (for example, see JP 2869054 B).

A thermal flow meter is equipped with a temperature-sensitive sensor (fluid temperature detection sensor) and a heating temperature-sensitive sensor (heating side temperature sensor), and is controlled such that the temperature of the heating temperature-sensitive sensor (flow velocity sensor (heater)), which is endowed with the functions of a temperature sensor and a heating sensor, exhibits a fixed temperature difference with respect to the temperature as measured by the temperature-sensitive sensor. This is due to the fact that the quantity of heat taken away from the heater when the fluid to be measured is passed is related to the mass flow rate, which is calculated from the heating power amount with respect to the heater (see, for example, JP 2004-12220 A).

JP 2006-29966 A discloses a technique related to a multi-vortex flow meter equipped with both the function of a vortex flow meter and the function of a thermal flow meter. The multi-vortex flow meter is capable of accurately measuring from minute flow rate to large flow rate, which makes it especially superior to other flow meters.

SUMMARY OF THE INVENTION

In the multi-vortex flow meter disclosed in JP 2006-29966 A, the metal tubular bodies of a temperature-sensitive sensor and a heating temperature-sensitive sensor extend directly to a flow rate converter; further, as can be seen from this structure, the lead wire of the vortex detector is wired separately from the lead wires of the temperature-sensitive sensor and the heating temperature-sensitive sensor, so that explosion-proof performance cannot be attained easily. Further, sealing performance is secured by using an O-ring, so that it is rather difficult to attain compatibility with high temperature.

The present invention has been made in view of the above-mentioned problems. It is an object of the present invention to provide a multi-vortex flow meter capable of attaining explosion-proof performance and compatibility with high temperature.

An explosion-proof high temperature compatible multi-vortex flow meter according to a first embodiment of the present invention, which has been made in order to solve the above-mentioned problems, includes: a vortex type detection means having a measurement tube provided in a flow path of a flow tube and allowing passage of a fluid to be measured, a vortex generator provided in the measurement tube so as to be opposed to a flow of the fluid to be measured, and a vortex detector for detecting a change due to a Karman vortex generated by the vortex generator; and a thermal detection means having a temperature-sensitive sensor and a heating temperature-sensitive sensor protruding into the flow path, characterized in that metal tubular bodies of the temperature-sensitive sensor and the heating temperature-sensitive sensor are fixed by welding in a liquid-tight fashion to a metal container of the vortex detector while inserted therein, in that lead wires of the temperature-sensitive sensor and the heating temperature-sensitive sensor thus fixed by welding and a lead wire of a sensor of the vortex detector are held together within the metal container, and in which the lead wires thus held together are led out toward a flow rate converter via a metal pipe mounted to the metal container.

According to the present invention having the above-mentioned features, the lead wires are held together within the metal container, and led out to the flow rate converter side via the metal pipe. Only one joint portion is involved between the sensors and the flow rate converter, and, with this structure, explosion-proof performance can be attained easily. Further, according to the present invention, the metal tubular bodies of the temperature-sensitive sensor and the heating temperature-sensitive sensor are fixed by welding to the metal container in a liquid-tight fashion. Since sealing performance is ensured without using any O-ring, it is possible to attain compatibility with high temperature.

In the explosion-proof high temperature compatible multi-vortex flow meter according to the first embodiment of the present invention, an explosion-proof high temperature compatible multi-vortex flow meter according to a second embodiment of the present invention has such a feature that the vortex generator is provided with a flange portion, and in that end portions of the metal tubular bodies of the temperature-sensitive sensor and the heating temperature-sensitive sensor are supported by the flange portion.

According to the present invention with the above-mentioned features, the temperature-sensitive sensor and the heating temperature-sensitive sensor are supported by the vortex generator. In a specific example of the arrangement and supporting, the metal tubular bodies of the temperature-sensitive sensor and the heating temperature-sensitive sensor are arranged so as to be parallel to the vortex generator. Further, the end portions of the metal tubular bodies of the temperature-sensitive sensor and the heating temperature-sensitive sensor are supported by the flange portion formed on the vortex generator.

While in the best mode for carrying out the invention described below the support positions are the end portions (distal end portions) of the metal tubular bodies, this should not be construed restrictively; other positions will do as long as they are ones helping to mitigate the concentrated stress generated at the base end portions of the metal tubular bodies (the base end portions of the portions protruding from the measurement tube through which the fluid to be measured flows).

According to the present invention according to the first embodiment it is possible to attain explosion-proof performance and compatibility with high temperature. According, to the present invention according to the second embodiment it is possible to mitigate the concentrated stress generated at the temperature-sensitive sensor and the heating temperature-sensitive sensor in the case of a high flow rate.

DETAILED DESCRIPTION OF THE INVENTION

Figure 1:
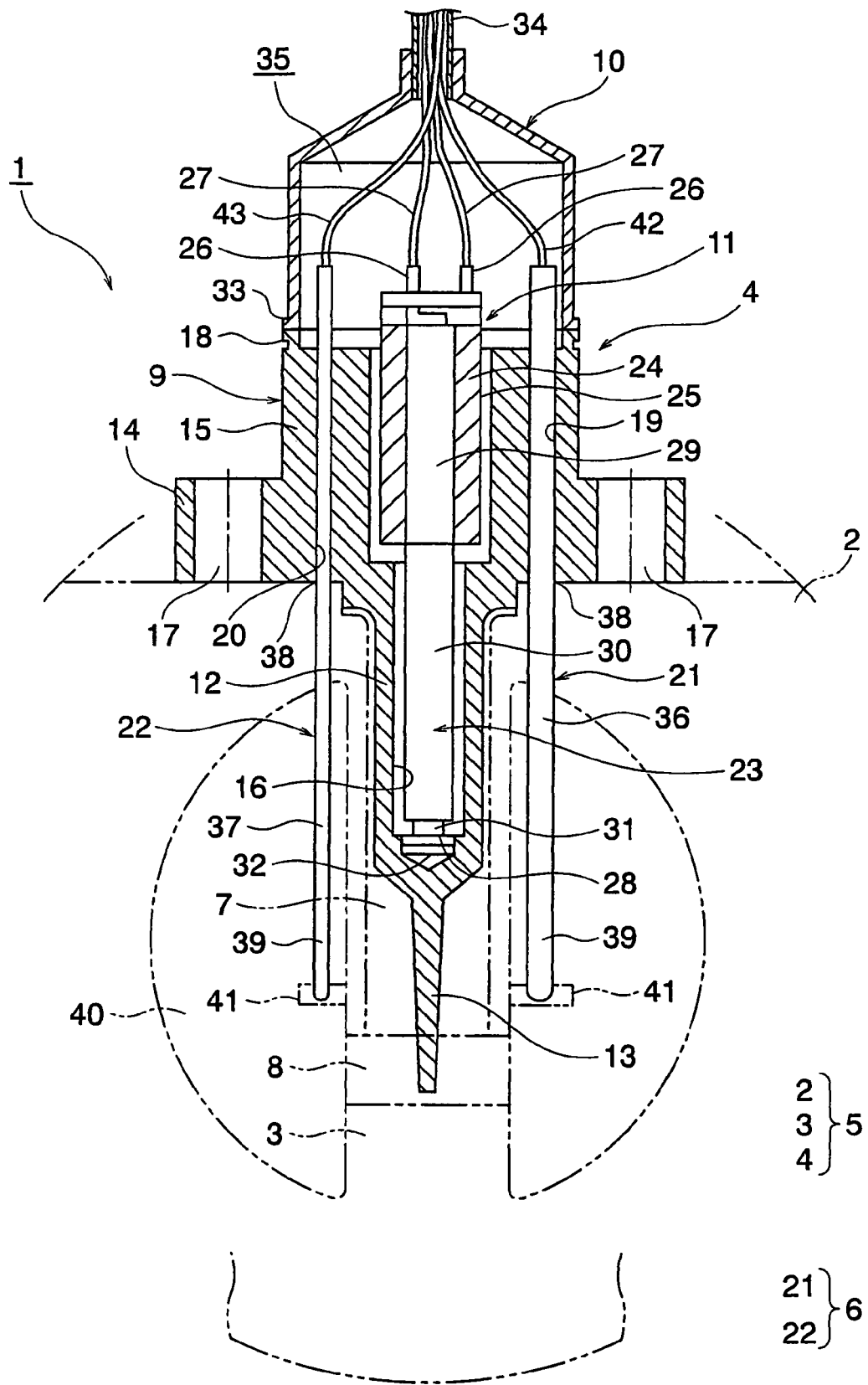
FIG. 1 is a sectional view of an explosion-proof high temperature compatible multi-vortex flow meter according to an embodiment of the present invention.

In the following, the present invention will be described with reference to the drawing. FIG. 1 is a sectional view of an explosion-proof high temperature compatible multi-vortex flow meter according to an embodiment of the present invention.

In FIG. 1, reference numeral 1 indicates a multi-vortex flow meter according to the present invention. The multi-vortex flow meter 1 is endowed with both the function of a vortex flow meter and the function of a thermal flow meter. Further, the multi-vortex flow meter 1 is structured so as to be capable of attaining explosion-proof performance and compatibility with high temperature. The multi-vortex flow meter 1 is equipped with a vortex type detection means 5 having a measurement tube 2, a vortex generator 3, and a vortex detector 4, a thermal detection means 6, and a flow rate converter (not shown) for calculating the flow velocity or flow rate of the fluid to be measured (not shown) based on output signals from the vortex type detection means 5 and the thermal detection means 6. In the following, the above-mentioned components will be described.

The measurement tube 2 constituting the vortex type detection means 5 is formed as a tube having, for example, a circular sectional configuration. The measurement tube 2 is formed so as to extend in the direction in which the fluid to be measured flows. The vortex generator 3 constituting the vortex type detection means 5 is a portion for generating a vortex within the measurement tube 2, and is configured so as to be opposed to the flow of the fluid to be measured.

In this embodiment, the vortex generator 3 is formed as a triangular prism. (This configuration is only given by way of example. In Patent Document 1, i.e., in JP 2869054 B, there are disclosed several examples of its configuration.) The vortex generator 3 has a measurement chamber 7 open at one end. The measurement chamber 7 is formed so as to extend in the axial direction of the vortex generator 3. In the measurement chamber 7, there is formed a pressure guide hole 8 extending therethrough in a direction orthogonal to the flow of the fluid to be measured. The pressure guide hole 8 is formed for the purpose of introducing a fluctuation pressure due to a vortex (Karman vortex) into the measurement chamber 7.

The vortex detector 4 constituting the vortex type detection means 5 is equipped with a vibration tube 9 and a cover 10 that are formed of stainless steel, and a vortex detection sensor 11. The vortex detector 4, constructed as described above, is integrated with the thermal detection means 6. The vibration tube 9 has a movable tube portion 12 inserted into the measurement chamber 7, a pressure receiving plate 13 continuously formed at one end of the movable tube portion 12, a vibrating portion mounting flange 14 formed continuously at the other end of the movable tube portion 12 and fixed to the fixation portion for the measurement tube 2, a vibration tube head portion 15 formed continuously with the vibrating portion mounting flange 14, and a hollow portion 16 formed so as to extend from the vibration tube head portion 15 to a portion in the vicinity of the above-mentioned one end of the movable tube portion 12.

The movable tube portion 12 is configured so as to leave a slight gap with respect to the inner peripheral surface of the measurement chamber 7. The pressure receiving plate 13 is formed and arranged so as to be matched with the position of the pressure guide hole 8. The vibrating portion mounting flange 14 has bolt holes 17. The vibration tube head portion 15 has a fixation portion 18 for the fixation of the cover 10. The vortex detection sensor 11 is inserted into the hollow portion 16 so as to leave a slight gap. On the outer side of the hollow portion 16, there are formed tubular body insertion holes 19, 20 extending through the vibration tube head portion 15. The tubular body insertion holes 19, 20 are formed for the purpose of fixation of a temperature-sensitive sensor 21 and a heating temperature-sensitive sensor 22 of the thermal detection means 6 described below.

The vortex detection sensor 11 faithfully receives pressure fluctuation due to a Karman vortex received by the vibration tube 9 and converts it to an electric signal, which is output to a flow rate converter (not shown). More specifically, it is equipped with an elastic base member 23, piezoelectric element plates 24, electrode plates 25, terminals 26, lead wires 27, and a spring plate 28.

The elastic base member 23 is a metal column varying in diameter and has an upper end portion 29, a support column portion 30, and a spring mounting portion 31. The piezoelectric element plates 24 are attached to the upper end portion 29. The support column portion 30 is a portion to be inserted into the movable tube portion 12, and is configured so as to leave a slight gap with respect to the hollow portion 16. The upper end portion 29 is continuously formed at the upper end of the support column portion 30, and the spring mounting portion 31 is continuously formed at the lower end of the support column portion 30. The spring mounting portion 31 is of a smaller diameter than the support column portion 30, and the spring plate 28 is continuously connected thereto by welding or the like.

The spring plate 28 is a portion which is inserted into an engagement recess 32 formed at an end of the hollow portion 16 and allows supporting through spring action; it has a plurality of radial slits (not shown). The spring plate 28 is formed so as to have a diameter somewhat larger than the diameter of the engagement recess 32.

The piezoelectric element plates 24 are piezoelectric elements respectively attached to two beveled portions of the upper end portion 29 by using a conductive adhesive such as gold paste; attached to the non-attached surfaces are the electrode plates 25 including, for example, porous plates. The piezoelectric element plates 24 are connected to the lead wires 27 via the terminals 26.

The cover 10 is provided for the purpose of sealing the vortex detection sensor 11. The cover 10 has a fixation portion 33 to be fixed to the fixation portion 18 of the movable tube portion 12 while in face contact therewith. A metal pipe 34 is fixed in an airtight fashion to the center of the upper portion of the cover 10. The metal pipe 34 is an insertion pipe for drawing out the lead wires; it is formed so as to extend toward the flow rate converter (not shown). The cover 10 forms a metal container together with the movable tube portion 12; when the cover 10 is fixed to the fixation portion 18 of the movable tube portion 12 via the fixation portion 33, there is defined an internal space 35. In this embodiment, electron beam welding is adopted (by way of example) for the fixation of the fixation portions 18, 33.

The thermal detection means 6 is equipped with the temperature-sensitive sensor 21 and the heating temperature-sensitive sensor 22. As both the temperature-sensitive sensor 21 and the heating temperature-sensitive sensor 22, known sensors are used. The temperature-sensitive sensor 21 of this embodiment is a rod-shaped temperature sensor, and the heating temperature-sensitive sensor 22, which is also rod-shaped, is a flow velocity sensor (heater) endowed with the functions of a temperature sensor and a heating sensor. The temperature-sensitive sensor 21 and the heating temperature-sensitive sensor 22 respectively have metal tubular bodies 36 and 37. The temperature-sensitive sensor 21 and the heating temperature-sensitive sensor 22 are fixed in position in a liquid-tight fashion by welding, with the metal tubular bodies 36 and 37 being inserted into the tubular body insertion holes 19 and 20 of the vortex detector 4. (In this embodiment, vacuum brazing is adopted (by way of example). Sealing performance is secured without using any O-ring. Thus, compatibility with high temperature can be attained.) The welding is effected, for example, at the positions indicated by reference numeral 38.

The temperature-sensitive sensor 21 and the heating temperature-sensitive sensor 22 respectively have temperature-sensitive portions 39 protruding into a flow path 40 of the flow tube 2. The foremost end portions of the temperature-sensitive sensor 21 and the heating temperature-sensitive sensor 22 are supported by flange portions 41, 41 formed on the vortex generator 3 (to realize a structure helping to mitigate the concentrated stress). The temperature-sensitive sensor 21 and the heating temperature-sensitive sensor 22 are arranged parallel to the vortex generator 3. The temperature-sensitive sensor 21 and the heating temperature-sensitive sensor 22 are arranged so as not to affect vortex detection.

The temperature-sensitive sensor 21 and the heating temperature-sensitive sensor 22 respectively have lead wires 42 and 43 held together with the lead wires 27 of the vortex detection sensor 11 within the internal space 35. And the lead wires 27, 42, and 43, thus held together are led out toward the flow rate converter (not shown) via the metal pipe 34.

Since the lead wires 27, 42, and 43 are held together within the internal space 35 and led out toward the flow rate converter via the metal pipe 34, there is involved only one joint portion between the sensors and the flow rate converter. With this structure, explosion-proof performance can be attained more easily than in the prior art.

Regarding the function of the flow rate converter (not shown), reference is to be made to Patent Document 3 in the background art section of the present specification.

In the multi-vortex flow meter 1 of the present invention, it is possible to use either the function of a vortex flow meter or the function of a thermal flow meter according to the condition of the flow of the fluid to be measured flowing through the flow path 40 of the flow tube 2. (That is, in a minute flow rate region and low flow rate region, measurement is performed by the function of a thermal flow meter, and, in a high flow rate region, measurement is performed by the function of a vortex flow meter.)

As can be seen from the above description, the multi-vortex flow meter 1 of the present invention is of a structure helping to attain explosion-proof performance and compatibility with high temperature.

In addition to this, the present invention naturally allows various modifications without departing from the gist of the invention.

The invention claimed is:

1. An explosion-proof high temperature compatible multi-vortex flow meter for measuring a flow rate of a fluid in a flow tube, the multi-vortex flow meter comprising a vortex type detection means and a thermal type detection means,
    the vortex type detection means including:
        a measurement tube provided in a flow path of the flow tube and allowing passage of the fluid to be measured,
        a vortex generator provided in the measurement tube so as to be opposed to a flow of the fluid to be measured, and
        a vortex detector for detecting a change due to a Karman vortex generated by the vortex generator; and
    the thermal type detection means including a temperature-sensitive sensor and a heating temperature-sensitive sensor, both protruding into the flow path and formed of metal tubular bodies,
    wherein the metal tubular bodies of the temperature-sensitive sensor and the heating temperature-sensitive sensor are fixed, by welding in a liquid-tight fashion, to a metal container of the vortex detector while inserted therein so that temperature-sensitive portions of the temperature-sensitive sensor and the heating temperature-sensitive sensor protrude into the flow path,
    wherein lead wires of the temperature-sensitive sensor, the heating temperature-sensitive sensor, and the vortex detector are held together within the metal container, and
    wherein the lead wires are led out toward a flow rate converter via a metal pipe mounted to the metal container.

2. An explosion-proof high temperature compatible multi-vortex flow meter according to claim 1,
    wherein the vortex generator is provided with a flange portion, and
    wherein end portions of the metal tubular bodies of the temperature-sensitive sensor and the heating temperature-sensitive sensor are supported by the flange portion.

3. The explosion-proof high temperature compatible multi-vortex flow meter according to claim 1,
    wherein the vortex generator has a measurement chamber open at one end, the measurement chamber including a pressure guide hole formed to extend in a direction orthogonal to the flow of the fluid to be measured and formed to introduce a fluctuation pressure due to the Karman vortex.

4. The explosion-proof high temperature compatible multi-vortex flow meter according to claim 1,
    wherein the vortex detector includes a vortex detection sensor and a vibration tube and a cover that are formed of a metal and mounted to the measurement tube.

5. The explosion-proof high temperature compatible multi-vortex flow meter according to claim 4,
    wherein the vibration tube has a hollow portion, a movable tube portion inserted into the measurement chamber of the vortex generator, and two tubular body insertion holes formed on an outer side of the hollow portion, the vortex detection sensor being inserted into the hollow portion, the temperature-sensitive sensor and the heating temperature-sensitive sensor each separately extending through respective one of the two tubular body insertion holes to be fixed thereto.

6. The explosion-proof high temperature compatible multi-vortex flow meter according to claim 4,
    wherein the vortex detection sensor includes an elastic base member formed of a metal column varying in diameter, piezoelectric element plates attached to the elastic base member, and lead wires for outputting pressure fluctuation due to the Karman vortex to a flow rate converter by the piezoelectric element plates.

7. The explosion-proof high temperature compatible multi-vortex flow meter according to claim 4,
wherein the cover is fixed to a vibration tube head portion and, together with a movable tube portion, forms the metal container, the cover including an upper portion to which a metal pipe is mounted in an airtight fashion in a center thereof.

8. The explosion-proof high temperature compatible multi-vortex flow meter according to claim 1,
wherein the temperature-sensitive sensor and the heating temperature-sensitive sensor, together forming the thermal detection means, each comprise a rod-shaped temperature sensor.

* * * * *